United States Patent
Van Berkel

(10) Patent No.: US 7,330,035 B2
(45) Date of Patent: Feb. 12, 2008

(54) OBJECT SHAPE DETERMINATION METHOD AND SYSTEM THEREFOR

(75) Inventor: Cornelis Van Berkel, Hove (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 128 days.

(21) Appl. No.: 10/557,656

(22) PCT Filed: May 21, 2004

(86) PCT No.: PCT/IB2004/001778

§ 371 (c)(1),
(2), (4) Date: Nov. 21, 2005

(87) PCT Pub. No.: WO2004/107157

PCT Pub. Date: Dec. 9, 2004

(65) Prior Publication Data

US 2007/0063707 A1    Mar. 22, 2007

(30) Foreign Application Priority Data

May 31, 2003   (GB)   ................................ 0312516.8

(51) Int. Cl.
*G01R 27/26*  (2006.01)

(52) U.S. Cl. ..................................... 324/671; 324/662
(58) Field of Classification Search ................ 324/671, 324/663, 658, 649, 600, 662, 690, 687, 688; 340/870.37
See application file for complete search history.

(56) References Cited

U.S. PATENT DOCUMENTS

| 4,136,957 A | 1/1979 | Uno et al. ................... 356/394 |
| 4,284,947 A | 8/1981 | Walton ....................... 324/671 |
| 6,025,726 A | 2/2000 | Gershenfeld et al. |
| 6,664,918 B2 | 12/2003 | Paradie et al. ................ 342/70 |
| 6,745,070 B2 | 6/2004 | Wexler et al. .............. 600/547 |
| 6,747,462 B2 | 6/2004 | Fasen et al. ................. 324/662 |
| 2002/0190964 A1 | 12/2002 | Van Berkel ................. 345/173 |

*Primary Examiner*—Vincent Q. Nguyen
*Assistant Examiner*—Hoai-An D. Nguyen

(57) ABSTRACT

An unknown object shape is computed using repeated iterations of electrostatic calculations on a predetermined shaped object and sensed electrostatic measurements. The predetermined object shape is morphed toward the unknown object shape at each iteration until the object shape is determined. The morphing of the shape is based on calculating the zero contour of the electrostatic potential, which potential depends on a charge distribution applied to the predetermined shape.

20 Claims, 5 Drawing Sheets

OBJECT SHAPE DETERMINATION METHOD AND SYSTEM THEREFOR

The present invention relates to methods for determining the shape of an object from electrostatic sensing, to methods for controlling a device or apparatus in dependence on said determined shape, and to apparatus comprising processing means and electrostatic sensing elements for performing said methods. The present invention has particular, but not exclusive, application to computer systems, displays, consumer electronic devices and other interactive devices where object shape determination may be used for gesture recognition, for example, thereby providing touchless control and interaction.

Many techniques for interacting with devices such as computers, vending machines or kiosks, displays, mobile phones and personal digital assistants or handheld computers are known. For example, direct input via keyboard/keypad and a "mouse" are well known to most computer users. Graphical user interfaces in particular use the "point and click" metaphor with a pointer under control of the pointing device (mouse) graphically representing position and action on a display. Touch-screen technologies based on pressure or capacitance sensing techniques are increasingly common, with plastic "pens" being used with handheld computers to provide intuitive interaction.

Another technique that can provide user interaction with a device is that of electric field sensing, sometimes referred to as quasi-electrostatic sensing. In general, a first transmitting electrode is excited by application of an alternating voltage which, due to capacitive coupling sets up electric field lines with a second receiving electrode and hence induces a displacement current in the second electrode. When an object is placed near the electrodes and hence in the extending field lines, some of the field lines are terminated by the object which leads to a decrease in the capacitive current. Hence, the presence of an object in close proximity to the electrodes may be sensed if the current is monitored.

The patent U.S. Pat. No. 6,025,726 discloses an electric field sensing arrangement which is intended for computer and other applications. The position of a user's finger or hand or whole body may be sensed, depending on the intended application. The circuitry and arrangement as described in U.S. Pat. No. 6,025,726 is somewhat bulky and complex which does not lend itself well to integration into a laptop or smaller handheld device with a display. Furthermore, the method disclosed to determine approximately the position of an object, for example, is based on the incorrect physical assumption that the electric field between transmitter and receiver electrodes is described by a dipole field and also on the incorrect assumption that this field is not perturbed by the presence of the object. Resolving the 3D shape or outline of an object is problematic with such a system and method.

There therefore arises a need for an electric field sensing method and apparatus that is able to determine the three dimensional shape of an object to enable, for example, control via gesture recognition.

According to a first aspect of the present invention there is provided a method for determining the shape of an unknown object placed in an electrostatic sensing region extending from sensor apparatus comprising a plurality of electrostatic receiving means and at least one electrostatic transmission means, the method comprising measuring the change in charge induced by said unknown object on each receiving means and storing said charge measurements as a first charge image dataset $C_f$, retrieving a predetermined shape dataset (PSD) representing point co-ordinates which define said predetermined shape, determining for the first charge image dataset $C_f$ a charge distribution dataset q' representing the charge distribution required on the predetermined shape to substantially result in the measured charge image $C_f$, calculating the electrostatic potential distribution in the sensing region corresponding to said charge distribution dataset q', generating a new shape dataset having co-ordinates corresponding to points in the sensing region where the electrostatic potential distribution is close to zero, and determining the new shape dataset as representing the shape of the unknown object in the sensing region by comparing the difference between the new shape dataset and the predetermined shape dataset against a predetermined threshold.

According to a second aspect of the present invention, there is provided a method for controlling a device comprising determining an object shape in accordance with the first aspect as described above, selecting from a list of control actions associated with predefined shapes a control action associated with said determined object shape, and executing said selected control action.

According to a third aspect of the present invention there is disclosed a system for determining the shape of an unknown object placed in an electrostatic sensing region extending from sensor apparatus comprising at least one electrostatic transmission means and a plurality of electrostatic receiving means, storage means for storing a predetermined shape dataset, and processing means for determining the shape of an unknown object placed in an electrostatic sensing region as mentioned in the first aspect above.

The aforementioned method aspect in general determines the shape of an unknown object by incrementally altering the shape of a predetermined known object in dependence on a calculated electrostatic potential contour. The altering of the predetermined shape is guided by calculating a (fictitious) charge distribution on the predetermined shape, the calculation being guided by considering the predetermined object as a grounded conductor which enables the use of a regularisation procedure such as Tikhonov regularisation.

The electrostatic potential distribution due to this fictitious charge distribution is then calculated, and the predetermined shape altered to more closely align in 3-D space with the position of the zero electrostatic potential contour. In this way a predetermined known hypothetical object shape is incrementally altered using the electrostatic potential contour=zero as the next best guess of the unknown shape.

In an embodiment the apparatus comprises a computer system having a microprocessor operable to perform the aforementioned method aspects, the processor and computer being linked to an electrostatic sensing plate comprising several receiver electrodes and several transmission electrodes.

Also provided is memory storage for storing the predetermined shape in the form of peripheral point co-ordinates onto which triangular elements are mapped. When an object is sensed by the receiver electrodes (signified by a change in output current) the processor monitors the charge received on each receiver, maps a suitable fictitious or hypothetical charge distribution onto the known object shape stored in memory, calculates the zero electrostatic potential contour and alters the position of each triangular element towards this contour, guided by the regularisation procedure, until a satisfactory fit has been found.

Said processor may determine the fit as being satisfactory by comparing the sum of the squared differences between the measured charge at the sensor plate and that which would be generated and therefore measured due to the fictitious charge dataset, and terminating the process when this sum is below a predetermined threshold of 5% difference for example.

Therefore, a predetermined shape (for example a sphere) is altered element by element until it approximates the unknown shape (for example a hand in a thumbs up gesture) placed in the vicinity of the apparatus. Hence, an iterative convergent process is obtained which enables the shape of unknown objects to be determined in an electric field sensing apparatus.

Additionally, the apparatus may comprise display means and a graphical user interface in which a control action associated with the determined shape is performed when said shape is determined.

According to another aspect of the present invention, program code comprising instructions that instruct a processor to perform the aforementioned method are provided, as is a program code carrier having said instructions provided thereon.

According to yet another aspect of the present invention, a method of controlling a device is provided, the control depending on the determination of the shape of an object as described in the first aspect.

Further features and advantages of the present invention are recited in the attached claims, the disclosure of which is incorporated herein by reference, and to which the reader is now directed.

The present invention will now be described, by way of example only, and with reference to the accompanying drawings wherein.

Figure 1:
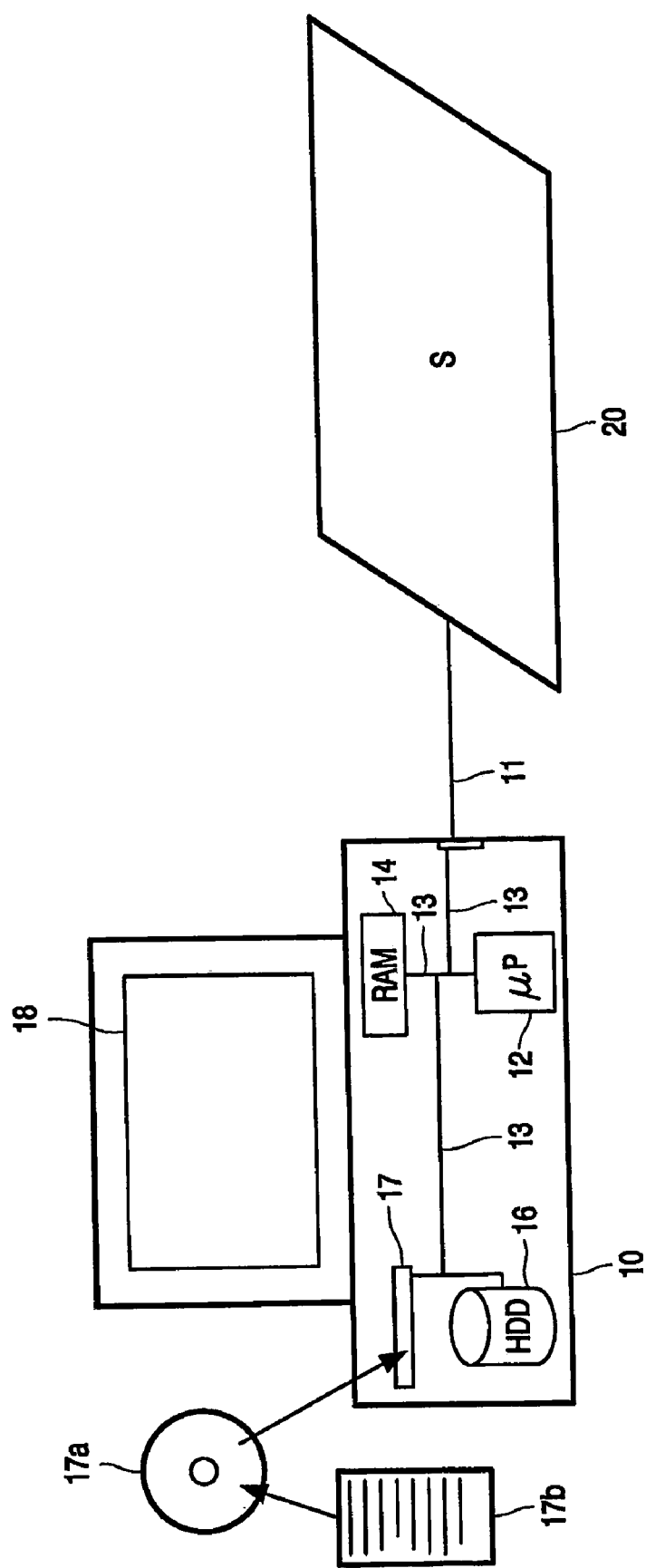
FIG. 1 shows a personal computer linked to an electric field sensing sensor plate.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

The embodiment shortly to be described comprises a system having an IBM™ compatible personal computer (PC) connected to sensing apparatus in the form of an electric field sensing plate having integrated field sensing electrodes and circuit components. The PC, in usual fashion, has processing means in the form of a general purpose microprocessor. Storage in the form of magnetic hard disk drives, memory and optical disk drives are provided for storing programs which, when loaded into memory and executed by the microprocessor cause aspects of the present invention to be performed. It should be noted that the PC may reside remote to the electric field sensing plate with only a connecting link therebetween being necessary to provide the PC with sensed measurements. The link may be provided by direct means (for example serial, USB or firewire implementations) or indirect means (such as network links over ethernet, either wired or wireless).

Those skilled in the art will readily appreciate that the exact configuration of the system will depend on the intended application scenario. For example, a local direct connection will suffice for home PC based user interaction and control based at least in part on object shape determination, whereas a network link may be more appropriate for security and access control applications. Furthermore, those skilled in the art will recognise that consumer electronic devices, handheld or otherwise, having storage and processing means and sensing apparatus may also embody the invention.

FIG. 1 is a schematic illustration of a system embodying the present invention. The system comprises a PC 10 connected by serial RS232 data link 11 to electric field sensing apparatus (S) 20. The PC 10 has an Intel™ Pentium class microprocessor 12 (or another suitable alternative such as those produced by AMD™) which is connected via databuses 13 to storage 14 (RAM), hard disk drive (HDD) 16 and optical disc drive 17. Method aspects of the present invention are embodied as software code 17b supplied originally on compact disc media 17a. The code 17b is copied to the hard disk drive 16 for local storage and execution. Of course, the code may be provided on other carrier media such as flash ram cards or floppy disks, or may be carried as a signal over the internet and hence downloaded to the PC on demand of the user. The code 17b, once supplied to the PC 10 will typically be installed onto the hard disk drive 16 for execution by microprocessor 12. Operating System code such as Microsoft Windows XP™ is also provided to enable normal operation of the PC. A display 18 is also provided as shown in the Figure.

Figure 2:
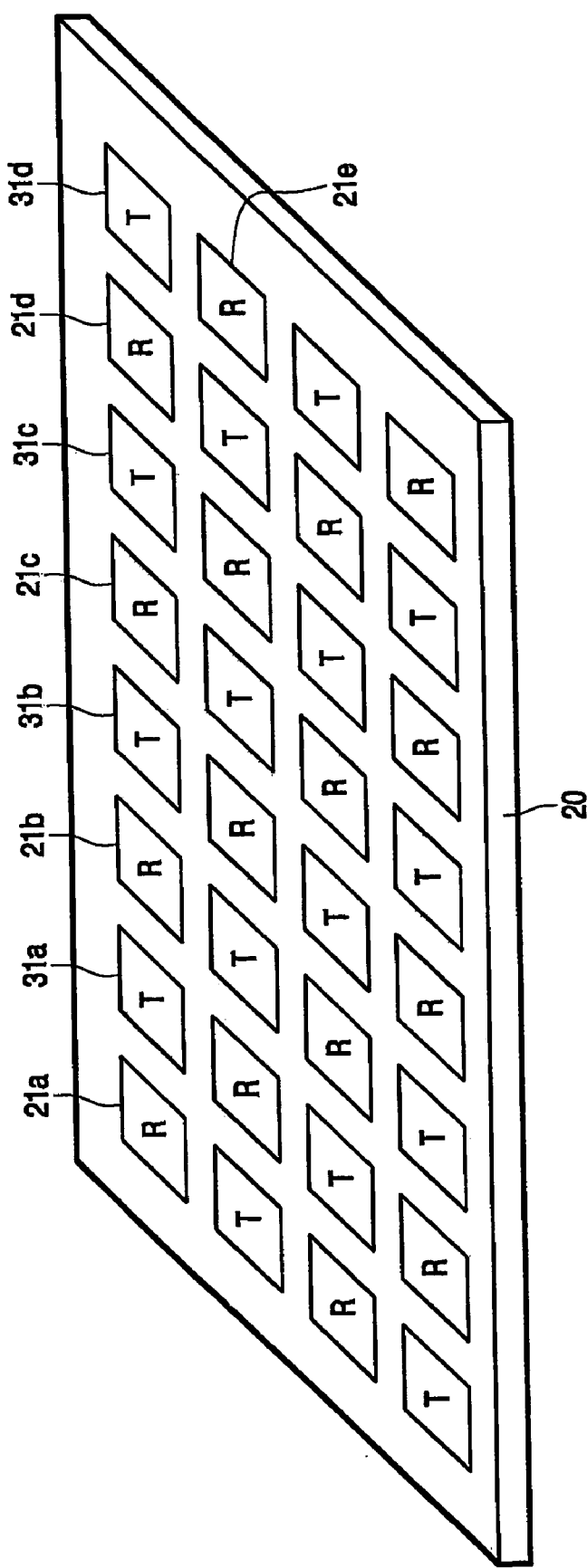
FIG. 2 shows the sensor plate in more detail.

FIG. 2 illustrates the sensing apparatus (S) 20 in more detail. The plate 20 comprises many rows of electric field receiving electrodes (R) 21a, 21b, 21c . . . , and transmitting electrodes (T) 31a, 31b, 31c . . . , the electrodes being arranged in a checkerboard or alternating pattern. The sensor may comprise as many as 800×600 individual electrodes, arranged in a matrix. For the sake of clarity only a few rows and columns are shown in the Figure. The configuration, circuit layout and circuit constituents of such a sensing plate 20 having a sensing array may optionally be integrated in for example a poly-silicon based thin film transistor liquid crystal display, with electrodes integrated with individual display pixels. The sensing plate technology and example sensing plate arrangements and circuits are more fully described in Applicants co-pending international application WO 02/103621 having the same inventor, published on the 27 Dec. 2002, the contents of which are hereby incorporated, and to the which the reader is now directed.

In operation, the plate 20 measures changes in charge induced on the receiving electrodes by the presence of an object, said changes in charge being provided to the PC 10 via serial link 11 for analysis via program 17b, the program having geometry information relating to the configuration and type of sensing plate attached either input by the user at initial installation, or automatically detected in an initial plug and play type of exchange between the program/PC 10 and the sensor plate 20.

Turning now to the determination of the shape of an object placed in the region above and close to the sensing plate 20. In general terms, an alternating potential voltage (in this case V=20V, f=100 kHz) is applied to each transmitting electrode 31a,b,c. This induces a potential on the surface of a conducting object (a human hand can be considered a conductor at f=100 kHz) placed in the sensing region above the ground plane defined by the sensor plate 20. This potential in turn induces a charge on the surface of the object such that the potential resulting from this charge distribution is equal, but opposite in sign to the transmitter potential so that the net potential at the object surface is zero. Finally, the charge induced on the object causes a change in the charge distribution at the sensor plate 20, this change being measured by the receiver electrodes (R) 21a,b,c. This charge change induced at the sensing plane is sometimes called a "charge image" in the technical art of electric field or electrostatic (capacitive) sensing.

In principle, one may monitor the charge image and calculate from this, using electrostatic theory, the potential distribution and identify the zero potential contour with the object shape. However, in practice the measured charge change by plate 20 is usually of the order of only a few to one femtoFarads (1 fF) per receiving electrode and hence inherently sensitive to noise. The uncertainty introduced into the measured charge image by the noise has, to the best of the inventor's knowledge, prevented any algorithm (and hence computer implementation of such) from converging on a meaningful solution which determines the probable shape of the object in the sensing region.

In the language of mathematicians, the electrostatic equations governing and describing the electric field sensing interaction between an object and a transmitter/receiver set up matrix equations that are ill posed. Hence, convergence to a solution of the matrix equations is rarely guaranteed, and in the limited cases where convergence to a solution is obtained, unphysical object shapes or charge distributions result.

However, Applicants have realised that, in mathematical terms, the problem may be regularised by assuming that the charge distribution on a known hypothetical object which is an insulator will be similar to that which would result on the known object if it is treated as a conductor.

Furthermore, the regularisation enables the electrostatic potential distribution in the 3D region above the sensing plate 20 to be evaluated. Crucially, the assumption hints that the zero electrostatic potential contour in the region will be close in shape to that of the actual object producing the image charge. Hence, the contour may be utilised to constitute a new hypothetical object, closer in shape to the actual object perturbing the system and creating the measured change in charge.

The above will now be described with reference to FIG. 3, which illustrates the steps according to a method aspect of the present invention as implemented in the computer system embodiment of FIG. 1.

Figure 3:
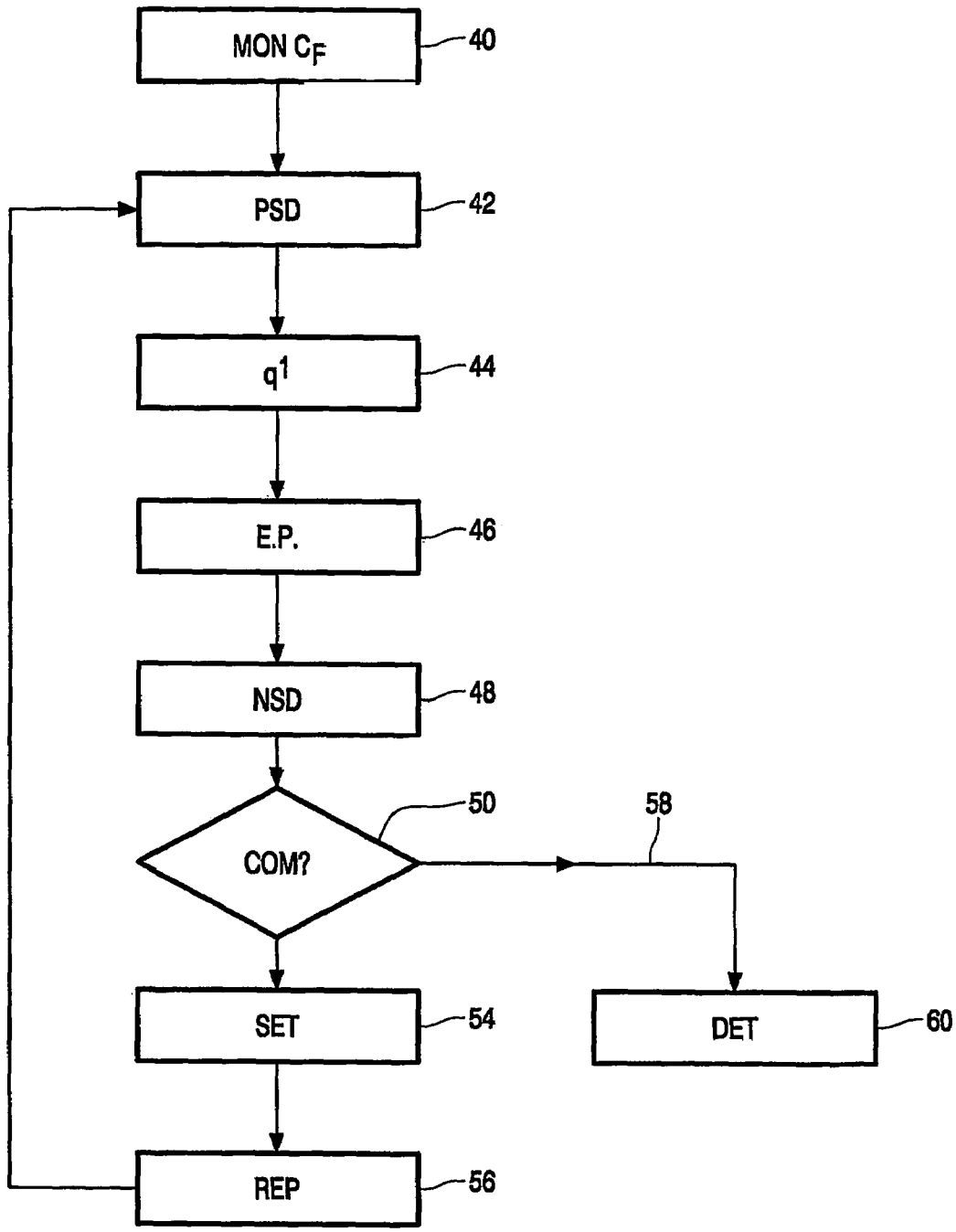
FIG. 3 is a flow diagram illustrating steps of a method according to the present invention.

FIG. 3 starts at step 40 wherein the computer 10 monitors the charge output by plate 20. A user then, for example, places an object such as his hand above the plate 20 and the change in charge is supplied from each receiver electrode 21a,b,c, to the computer which stores said charge as a first charge image dataset $C_f$ in memory 14.

The program 17b then causes processor 12 to then perform step 42 in which data representing a predetermined shape is retrieved from memory. In this embodiment applicants chose to store the shape as a sequence of triangles having position information relating them to the sensor plate. Hence, as is well known in the art of 3D graphics, the shape may be manipulated by moving individual triangles of the shape. The starting shape may be for example a sphere suspended a few centimeters above the plane defined by the sensing plate, and having dimensions within the x and y limit of said plate (say 20×20 cm for example).

The triangular elements are mapped onto the object surface so as to form the 3D predetermined shape, and hence the predetermined shape is stored in hard disk drive 16 as a dataset describing the point co-ordinates of said elements making up said shape.

Having retrieved the predetermined shape dataset (PSD) from storage 16 and passed to memory 18 for processing, the program then causes processor to move onto step 44 where the charge distribution q' required on the predetermined shape to result in the measured charge image $C_f$ is calculated.

This is achieved by, for the predetermined shape (which is not the shape/object which caused the charge image $C_f$) setting up a system of N linear equations:

$$Gq=t \quad (1)$$

where, G is a matrix dataset stored in computer memory comprising elements describing the electrostatic exchange potential between each point co-ordinate of the predetermined shape and each other point of the predetermined shape and t is a vector dataset describing the electrostatic exchange potential between each point co-ordinate of the predetermined shape and the point co-ordinates of the transmission electrodes 31a,b,c.

The computer program generates the system of N linear equations from, by example, considering a disk like transmitter and dividing the shape surface itself into N triangle elements with mid-points $p_i$, $\phi_i$ and $z_i$, each with a constant charge $q_i$, and defining the vector t:

$$t_i = \frac{V_t z_i}{2\pi} \int_0^{a_t} \int_0^{2\pi} \frac{\rho' \, d\phi' \, d\rho'}{(\rho_i^2 + \rho'^2 - 2\rho_i\rho'\cos(\phi') + z_i^2)^{3/2}} \quad (2)$$

by equation (2) above.

The elements of G are likewise given by equation (3) below:

$$G_{i,j} = \frac{1}{4\pi} \int_{\partial O_j} \left[ \frac{1}{\sqrt{\rho^2 + \rho_i^2 - 2\rho\rho_i\cos(\phi - \phi_i) + (z - z_i)^2}} - \frac{1}{\sqrt{\rho^2 + \rho_i^2 - 2\rho\rho_i\cos(\phi - \phi_i) + (z + z_i)^2}} \right] ds \quad (3)$$

Hence, the computer program, using numerical computation techniques such as those provided by NAG™ or MATLAB™ generates in memory datasets corresponding to G and t.

In order to describe the change in capacitance at sensor plate 20 the plate is discretised into segments $\delta R_i$, each with a capacitance $c_i$ and wherein a matrix having elements $M_{i,j}$ is defined as:

$$M_{i,j} = -\epsilon \frac{1}{2\pi V_t} \int_{\partial R_i'} \int_{\partial O_j} \frac{z}{(\rho^2 + \rho'^2 - 2\rho\rho'\cos(\phi - \phi') + z^2)^{3/2}} \, ds \, ds' \quad (4)$$

This gives a set of linear equations, $$C=Mq \quad (5)$$

describing a charge distribution q on a known object and the change in capacitance (charge image) on the ground plane (at the sensor plate).

In general, given the measured charge image $C_f$ from an unknown object, a charge distribution q' on the predetermined object (PSD) can in principle be calculated, where q' gives rise to the measured charge image dataset $C_f$. That is, q' is a least squares solution of $C_f$=Mq' where M is calculated for the known object (PSD). Unfortunately, as disclosed previously, the sensitivity of the values of $C_f$ to noise means that in practice finding unique solutions to equation (5) which are physical and reasonable is extremely difficult.

However, the realisation that the charge distribution q' on the predetermined shape as insulator, will be similar to that on the known object if it is a conductor allows a regularisation parameter $q_o$ to be defined in which $q_o$ is a solution to the set of linear equations defined by equation 1, i.e. t=Gq$_0$. Since it is assumed that the charge distribution q' will not be too different from the distribution q$_0$, the solutions for q' can be constrained by accepting values for q' that are similar to q$_0$. Thus equation (5) becomes solvable.

Hence, a converging solution for q' is determined despite the fact that M is ill conditioned (ill posed) as described previously, by for example using Tikhonov regularisation which in this case demands that values of q' must satisfy the equation given below:

$$q' = (M^T M + P)^{-1}(M^T C_f + P q_0) \qquad (6)$$

where P is a penalty term which defines the norm $q^T P q$. Hence, applying the above equations the computer program in step 44 determines from t=Gq$_0$, and $C_f$=Mq' values for q' in which said values are constrained by setting q' approximately equal to q$_0$.

The program then causes processor to move onto step 46 wherein the potential distribution in the space above the ground plane is calculated according to:

$$\Psi(r') = \Psi_t(T) - \int_{\partial O} G \frac{\partial \Psi}{\partial n} ds \qquad (7)$$

Following evaluation of the potential distribution, the program then, at step 48 alters the position of the triangular elements making up the predetermined shape so as to more closely align them with the position coordinates corresponding to the zero potential contour. Hence a new shape is generated.

An advantageously efficient way in which the zero potential contour and triangular element repositioning (steps 46 and 48) are computed by processor is as follows. The potential on the surface of each triangular element of the predetermined shape is computed following which a linear extrapolation of the potential to the zero potential contour is made. For example, the potential $v_i$ on each triangular element i, is given by:

$$\frac{1}{2}v = t - Gq' \qquad (8)$$

with the factor of ½ ensuring that proper account of the fact that the potential at a surface is being approximated. The amount $\delta x_i$ by which each triangular element i must move is then given by $-v_i/q'_i$ which in turn can be evaluated by the processor according to:

$$\delta x_i = \lambda \frac{2 \sum_j G_{i,j} q_j - t_i}{q_i} n_i \qquad (9)$$

where $\lambda$ is an attenuation factor introduced to avoid overshoot.

Hence each triangular element is repositioned so as to closer approximate the positions corresponding to the zero potential contour in the sensing region, thereby generating a new shape at step 48.

Various threshold criteria at step 50 may then be used to compare (COM) the new shape with the predetermined shape in order to decide whether to replace in memory 14 the predetermined shape with the new shape (step 54 SET) and at step 56 (REP) repeat steps 42 to 50 or whether to, from step 50, determine that the new shape corresponds closely to the unknown object and hence to stop the iteration via path 58 and determine (DET) the new shape as representing the unknown object shape at step 60.

For example at step 50, the new shape element positions may be compared with the predetermined or previous shape element dataset and if the difference is smaller than a difference threshold of say 5%, the program moves to step 60 wherein the new shape dataset is determined to be that of the unknown object shape.

More complex threshold calculations may be programmed, in which the sensor plate readings (charge image) $C'_f$ that would be produced by the new shape having charge distribution q' are calculated. This dataset $C'_f$ is then compared with the measured charge image dataset $C_f$ and if the least squares difference between corresponding values is below say a threshold of 0.1% then a satisfactory fit is determined and the process moves to step, 60 where the new shape dataset is returned as the unknown object shape and the iteration process ends.

In the first embodiment, the parameter q$_0$ was calculated according to equation (1) and subsequently used to regularise the determination of q' from equation (5). In an alternative embodiment, a heuristic approach to determining q$_0$ is applied. This approach involves, for the system of FIG. 1, simulating or measuring the actual charge distributions that are obtained for a variety of different shaped objects of similar size. These charge distributions are then averaged for each position in the sensing region, and the resultant data set used as q$_0$ as before to regularise (i.e. apply equation (6)) the determination of q' from equation (5)

In yet a further embodiment, the aforementioned method aspect is employed in a system (FIG. 1) to exert control according to the determined object shape. For example, the PC 10 stores 16 a list of predetermined object shapes such as hand gestures (for example thumbs up, a fist, and so on) which are associated with a control action. For example, a hand in the shape of the thumbs up gesture may be associated with an OK or approval control action, whilst a hand in the shape of a closed first may be associated with a stop or no approval control action. Hence, a user interacting with the system may receive a query from the system. The user, wishing to respond in the affirmative, does so by placing his hand in a thumbs up configuration in the sensing region. The processor 12 then determines the object shape as hereinbefore described, selects from the list the control action associated with the shape most closely resembling the determined shape, and performs the control action. Hence gesture recognition enabling control is provided.

Figure 4:
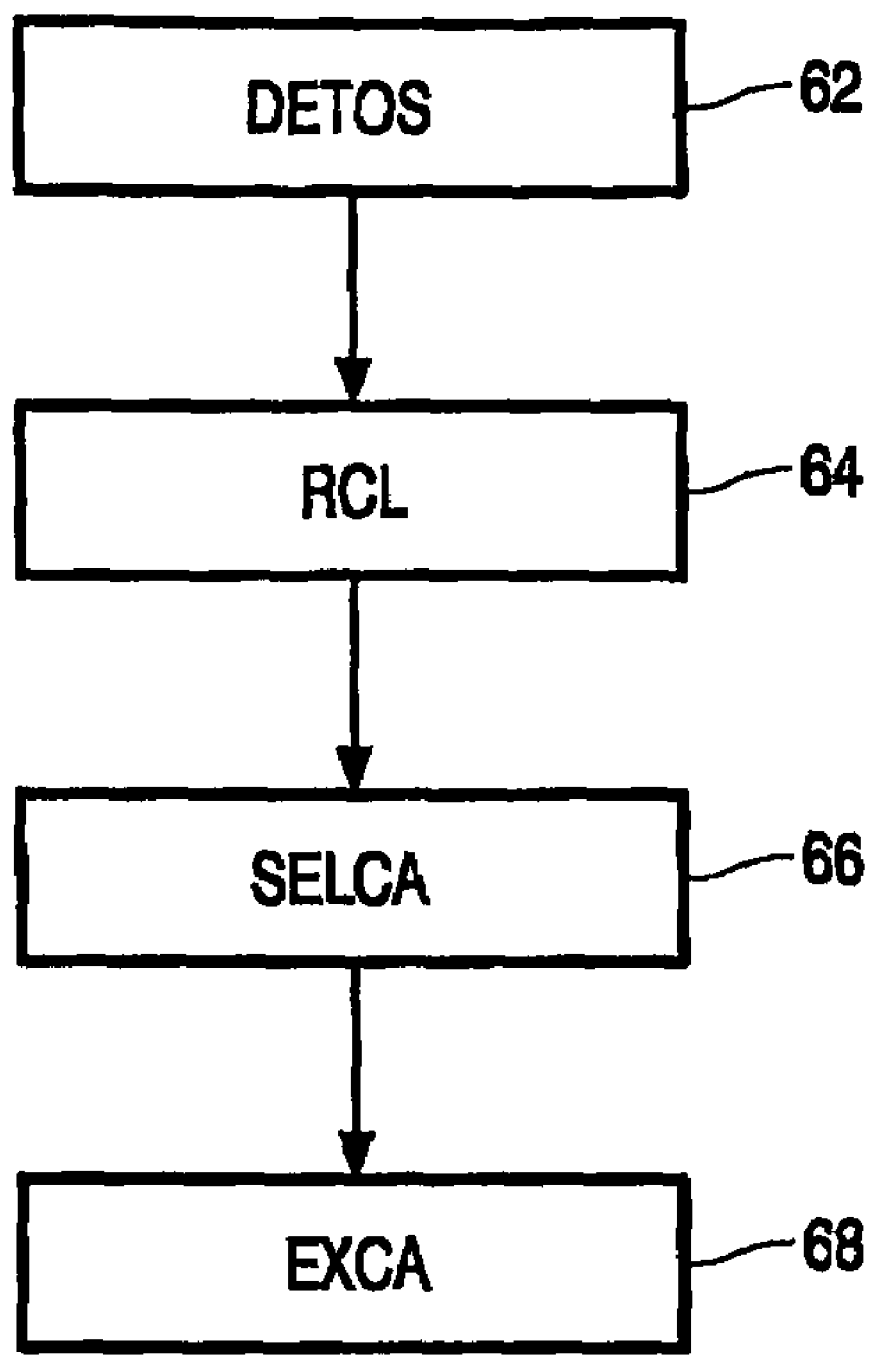
FIG. 4 is a flow diagram illustrating steps of a control method according to the present invention.

FIG. 4 illustrates steps according to this embodiment, where at step 62 (DETOS) the object shape is determined, following which at step 64 (RCL) the control list is retrieved and consulted at step 66 (SELCA) to select a control action to be performed, following which the selected control action is executed at step 68 (EXCA).

Figure 5:
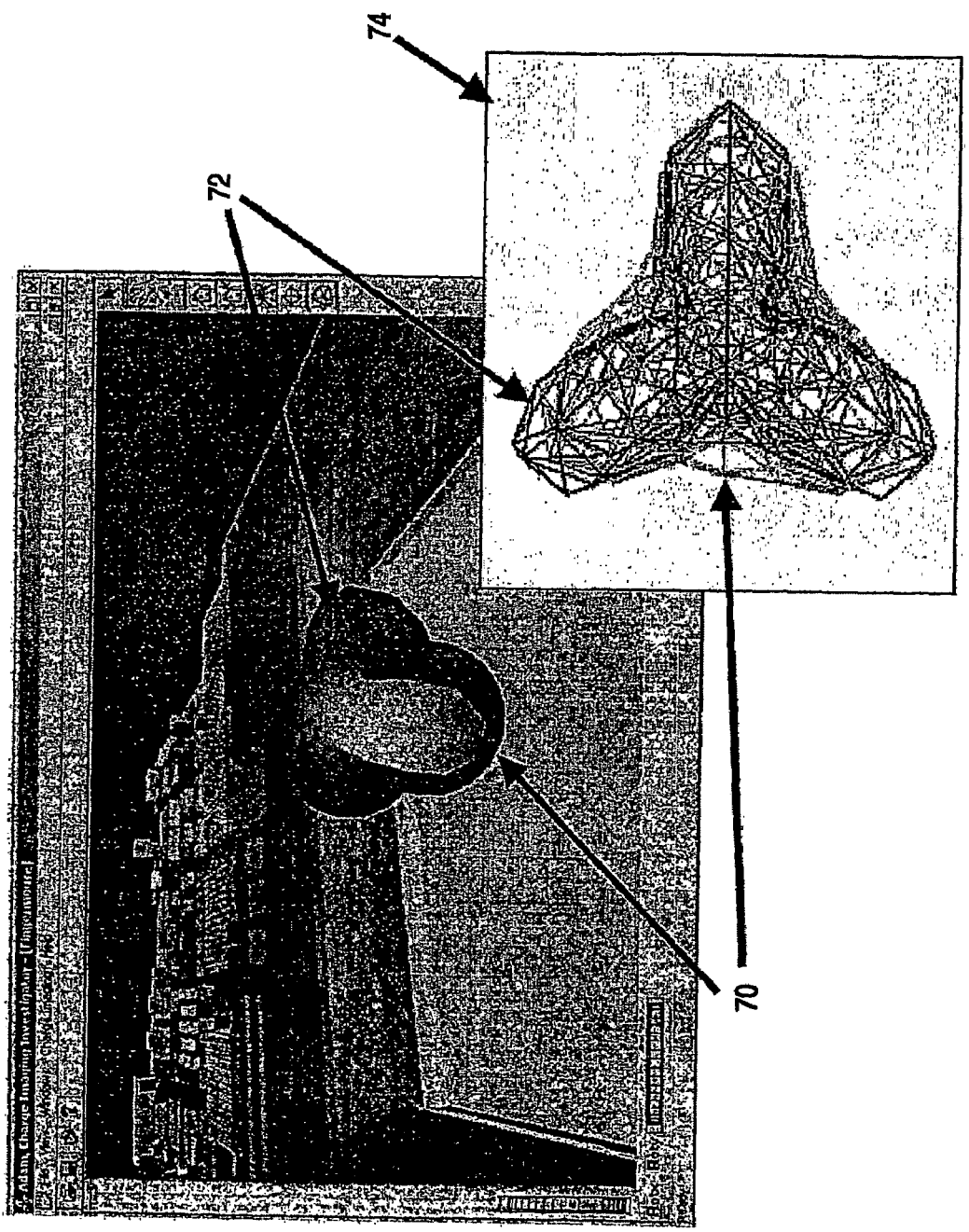
FIG. 5 is a screen shot of a display of a computer implementing a method according to the present invention.

FIG. 5 is a screenshot of an example computer implementation of the above to determine the shape of an unknown object. The method calculations were performed with a single transmitter 31a in the centre of the sensing area 20 and an array of 16×16 receiver electrodes 21a,b, distributed in a rectangular grid over the sensing area 20. The parameter λ was 0.02. The predetermined shape was a spheroid object 70 and the actual unknown object 72 is, for the sake of clarity only, shown in the figure. The result 74 after only sixty iterations is shown inset in the figure. As is shown in said inset, the predetermined shape (sphere) has morphed to approximate the shape of the unknown object, thereby showing that shape information is efficiently reconstructed according to the methods hereinbefore described.

In the above a system employing a PC and a sensing plate is described, the system operating methods according to aspects of the invention in which an unknown object shape is computed from electrostatic calculations on a predetermined shaped object and sensed measurements. The predetermined object is morphed in shape towards the unknown object shape at each iteration, until the object shape is determined. The system advantageously enables control and interaction with a device. Whilst the above embodiments describe a PC based system, those skilled in the art will recognise that other variations may be used.

For example, consumer devices such as television displays, set top boxes, Hi-Fi audio devices and automobiles may be equipped with processing means, program code and sensing apparatus to enable control of the devices based on object shape determination in accordance with the invention. Security and access control systems may similarly be equipped, with hand gesture interaction being used to, for example, gain access.

From reading the present disclosure, other modifications will be apparent to persons skilled in the art. Such modifications may involve other features which are already known in the design, manufacture and use of electrostatic sensing systems and component parts thereof and which may be is used instead of or in addition to features already described herein without departing from the spirit and scope of the present invention.

The invention claimed is:

1. A method for determining the shape of an unknown object placed in an electrostatic sensing region extending from sensor apparatus comprising a plurality of electrostatic receiving means and at least one electrostatic transmission means, the method comprising:

measuring the change in charge induced by said unknown object on each receiving means and storing said charge measurements as a first charge image dataset $C_f$, retrieving a predetermined shape dataset representing point co-ordinates which define said predetermined shape, determining for the first charge image dataset $C_f$ a charge distribution dataset q' representing the charge distribution required on the predetermined shape to substantially result in the measured charge image $C_f$, calculating the electrostatic potential distribution in the sensing region corresponding to said charge distribution dataset q', generating a new shape dataset having co-ordinates corresponding to points in the sensing region where the electrostatic potential distribution is close to zero, and determining the new shape dataset as representing the shape of the unknown object in the sensing region by comparing the difference between the new shape dataset and the predetermined shape dataset against a predetermined threshold.

2. The method of claim 1, wherein the determination of the charge image distribution q' comprises calculating for the predetermined shape:

M, a matrix dataset comprising elements describing the electrostatic exchange potential between each point co-ordinate of the predetermined shape and each point co-ordinate of the receiving means, G, a matrix dataset comprising elements describing the electrostatic exchange potential between each point co-ordinate of the predetermined shape and each other point of the predetermined shape, t, a vector dataset describing the electrostatic exchange potential between each point co-ordinate of the predetermined shape and the point co-ordinate of the transmission means, and wherein a charge distribution $q_0$ on the predetermined shape is used to regularise said determination of q' from $C_f$=Mq'.

3. The method of claim 2, wherein $q_0$ is calculated from t=$Gq_0$.

4. The method of claim 1, wherein the comparison step comprises calculating a secondary charge image distribution $C_f'$ for the new shape dataset, and wherein the difference for comparison against the predetermined threshold is computed by comparing the sum of the squared differences between $C_f'$ and $C_f$.

5. The method of claim 1, wherein the point co-ordinates of said predetermined shape dataset define triangular elements of said known shape.

6. The method of claim 5, wherein the new shape dataset is generated by extrapolating the distance by which to move each triangular element in the sensing region to points where the electrostatic potential distribution is zero.

7. The method of claim 1, wherein the predetermined threshold is 5%.

8. A method for controlling a device comprising:
determining an object shape by the method of claim 1,
selecting from a list of control actions associated with predefined shapes a control action associated with said determined object shape, and executing said selected control action.

9. A system for determining the shape of an unknown object placed in an electrostatic sensing region extending from sensor apparatus comprising at least one electrostatic transmission means and a plurality of electrostatic receiving means, storage means for storing a predetermined shape dataset, and processing means for carrying out the method of claim 1.

10. The system of claim 9, further comprising:
selecting means for selecting from a stored list of control actions associated with predefined shapes a control action associated with said determined object shape, and
control means for executing said selected control action.

11. The method of claim 2, wherein the comparison step comprises calculating a secondary charge image distribution $C_f^1$ for the new shape dataset, and wherein the difference for comparison against the predetermined threshold is computed by comparing the sum of the squared differences between $C_f^1$ and $C_f^1$.

12. A program code carrier carrying program code which when supplied to processing means cause said processor to carry out the method of claim 1.

13. The method of claim 3, wherein the comparison step comprises calculating a secondary charge image distribution $C_f^1$ for the new shape dataset, and wherein the difference for comparison against the predetermined threshold is computed by comparing the sum of the squared differences between $C_f^1$ and $C_f^1$.

14. The method of claim 13, wherein the point co-ordinates of said predetermined shape dataset define triangular elements of said known shape.

15. The method of claim 3, wherein the point co-ordinates of said predetermined shape dataset define triangular elements of said known shape.

16. The method of claim 4, wherein the point co-ordinates of said predetermined shape dataset define triangular elements of said known shape.

17. The method of claim 2, wherein the point co-ordinates of said predetermined shape dataset define triangular elements of said known shape.

18. The method of claim 17, wherein the new shape dataset is generated by extrapolating the distance by which to move each triangular element in the sensing region to points where the electrostatic potential distribution is zero.

19. The method of claim 15, wherein the new shape dataset is generated by extrapolating the distance by which to move each triangular element in the sensing region to points where the electrostatic potential distribution is zero.

20. The method of claim 16, wherein the new shape dataset is generated by extrapolating the distance by which to move each triangular element in the sensing region to points where the electrostatic potential distribution is zero.

* * * * *